United States Patent [19]

Gasper et al.

[11] Patent Number: 5,283,020
[45] Date of Patent: Feb. 1, 1994

[54] COMPONENT PROTECTION FROM CONTAMINANTS

[75] Inventors: John E. Gasper, Hebron; Mark R. Jaworowski, East Hartford; Edward J. Iarusso, Meriden, all of Conn.

[73] Assignee: United Technologies Corporation, Hartford, Conn.

[21] Appl. No.: 413,573

[22] Filed: Sep. 28, 1989

[51] Int. Cl.⁵ .............................................. B29C 67/22
[52] U.S. Cl. ..................................... 264/46.6; 29/424
[58] Field of Search ................. 264/46.6, 46.8, 221, 264/317, DIG. 44; 29/423, 424

[56] References Cited

U.S. PATENT DOCUMENTS

| | | | |
|---|---|---|---|
| 2,641,439 | 6/1953 | Williams | 29/424 |
| 2,663,928 | 12/1953 | Wheeler, Jr. | 29/148 |
| 2,891,307 | 6/1959 | Betteridge | 29/423 |
| 2,947,076 | 8/1960 | Eccles et al. | 29/424 |
| 2,965,959 | 12/1960 | Horne et al. | 29/423 |
| 3,817,060 | 6/1974 | Carrotte et al. | 29/424 |
| 3,943,215 | 3/1976 | Grune et al. | 264/46.8 |
| 3,950,461 | 4/1976 | Levens | 264/46.9 |
| 4,118,861 | 10/1978 | Palmisano | 264/112 |
| 4,156,306 | /1979 | Seidel et al. | 29/423 |
| 4,186,586 | 2/1980 | Takamura et al. | 29/423 |
| 4,187,595 | 2/1980 | Kuhn, Jr. | 29/424 |
| 4,268,571 | 5/1981 | McCarthy | 428/236 |
| 4,288,475 | 9/1981 | Meeker | 427/294 |
| 4,297,308 | 10/1981 | Popplewell | 264/267 |
| 4,452,658 | 6/1984 | Schramm | 156/245 |
| 4,521,354 | 6/1985 | Engelke et al. | 264/46.6 |
| 4,524,499 | 6/1985 | Grimes et al. | 29/156.8 |
| 4,640,728 | 3/1987 | Martin et al. | 264/DIG. 44 |
| 4,648,921 | 3/1987 | Nutter, Jr. | 156/77 |
| 4,681,724 | 7/1987 | Faiz et al. | 264/221 |
| 4,738,809 | 4/1988 | Storch | 264/46.8 |
| 4,844,142 | 7/1989 | Edge | 164/253 |
| 4,854,368 | 8/1989 | Vezirian | 164/34 |
| 4,862,575 | 9/1989 | Shirai et al. | 29/424 |
| 4,907,638 | 3/1990 | Hubbell et al. | 164/34 |

FOREIGN PATENT DOCUMENTS

| | | |
|---|---|---|
| WO79/0082 | 10/1979 | European Pat. Off. . |
| 1519211 | 7/1975 | United Kingdom ........ C08G 12/44 |
| 2149328A | 11/1984 | United Kingdom .......... B23Q 3/00 |
| 2201106A | 12/1986 | United Kingdom .......... B23Q 3/00 |

Primary Examiner—Allan R. Kuhns
Attorney, Agent, or Firm—Charles E. Sohl

[57] ABSTRACT

During the manufacturing process for turbine blades and vanes, among other hollow articles, the hollow cavities can become contaminated. Removal of the contaminants is a tedious, time consuming process which commonly results in component rework or rejection. Introducing a foam filler into the hollow cavities, prior to manufacturing, prevents contamination; enhancing manufacturing efficiency and component integrity.

2 Claims, 3 Drawing Sheets

COMPONENT PROTECTION FROM CONTAMINANTS

The Government has rights in this invention pursuant to a contract awarded by the Department of the Air Force.

DESCRIPTION

1. Technical Field

This invention relates to the manufacture of hollow articles, and especially to filling and sealing hollow articles with foam to prevent contaminants from entering the hollow article during subsequent processing.

2. Background Art

While the invention will be described in connection with turbine engine blades and vanes, the invention is by no means limited thereto. The process may just as readily be used with any hollow article which is not adversely affected by the filler material and which can withstand the removal process.

Many turbine engine components are intricately configured. Blades and vanes often have a hollow core with shaped cavities for air cooling. During manufacture of the component, contaminants such as heavy metal elements, processing chemicals, abrasive grit, shot beads, coating material (thermal barrier, abrasive, abradable), and metal chips, among others, can become entrapped within the core cavities.

Removal of the contaminants, if possible, is often a long, tedious job, frequently performed by hand. Often, particles lodged within the component cannot be removed by conventional processes; resulting in rejected and reworked components.

An objective of the present invention is to provide a process which will improve manufacturing efficiency by preventing undesirable contaminants from entering hollow articles.

DISCLOSURE OF INVENTION

This invention relates to filling hollow cavities within articles, such as the intricate cavities within a turbine blade or vane, after casting and prior to further manufacturing or coating (hereafter referred to as manufacturing) in order to prevent contamination. This is accomplished by filling the cavities with an expanding polymeric material. The material rapidly expands within the cavities, causing the surface connected internal cavities to be filled. The material is cured by exposing it to air, at room temperature. During curing, the material becomes a rigid closed cell structure which is intimately bonded to the internal surfaces of the filled component. The cured material can be removed by various techniques, such as heating the filled articles, causing the crude material to degrade, gasify, and dissipate, and solvent dissolution.

The foregoing and other features and advantages of the present invention will become more apparent from the following description and accompanying drawings.

BEST MODE FOR CARRYING OUT THE INVENTION

During manufacture of turbine blades and vanes, the internal cavities can become contaminated. Post-manufacturing, these contaminants must be removed from the component; a manual, tedious job. A possible solution to this problem is to prevent the contamination.

Contamination of the components can be prevented by sealing the intricate core cavities which are connected to the surface prior to manufacturing. Sealing these cavities, according to the present invention, has the advantages of not only preventing contamination, increasing the component integrity, decreasing the labor time, and decreasing the amount of post-manufacturing decontamination, but also of reducing component rework and rejections. Also, after cured material removal, if subsequent manufacturing processing requires exposing the article to contaminants, such as rework, the component can be "refilled".

Important factors in selecting the material are: density, bonding, curing time, removal time and process, and effects on the component. Density affects the expandability of the material; as the density increases, the expandability decreases. The preferred density is up to approximately 35 lbs/ft$^3$, with about 10 lbs/ft$^3$ to about 15 lbs/ft$^3$ especially preferred. Intimate bonding between the filler material and the internal cavity surfaces (where the cavities connect to the surface) prevents tiny particles from becoming lodged in the cavities between the material and the component. Curing and removal times are important for reasons of practicability; a shorter period enhances productivity.

Figure 3:
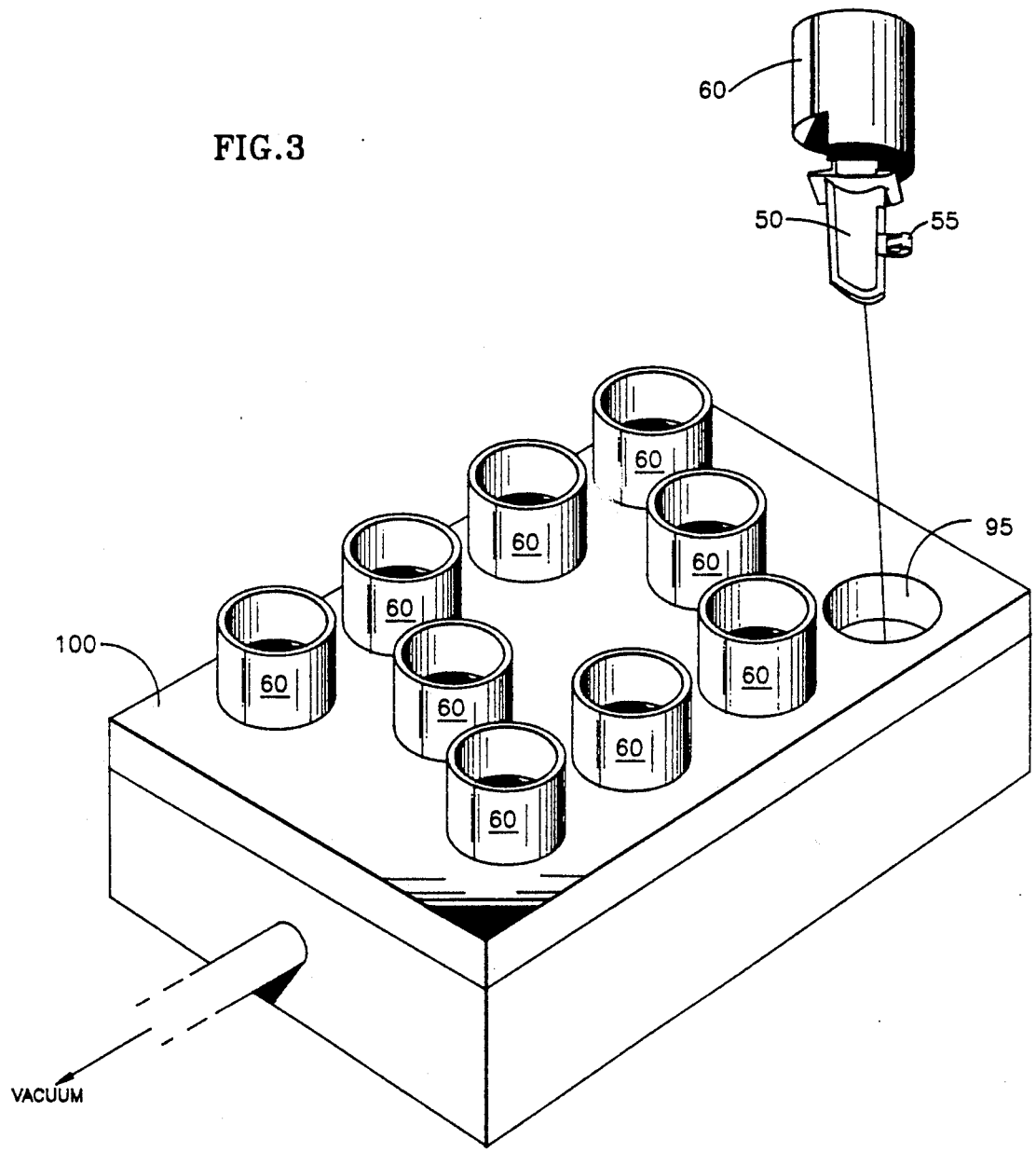
FIG. 3 is a schematic of an embodiment of the present invention utilizing negative pressure infiltration.

Easy installation, removal, and a substance which does not effect the integrity of the component, are also desirable. Easy installation and removal enhances manufacturing productivity. Installation or filling is principally accomplished by gravity feeding the article (refer to FIG. 1) or, as that shown in FIG. 3, negative pressure infiltrating; depending on the component.

Various removal techniques can be employed, such as solvent dissolution or thermal removal. Since thermal removal is preferred, an important aspect of the removal process is the removal temperature; a temperature greater than any of the temperatures used on the component during manufacturing. For turbine blades, for example, the removal temperature preferably ranges from about 650° C. to about 900° C. for thermoset materials. Higher temperatures will decrease the removal time, but may also damage the component; lower temperatures will require a longer remove time and may cause soot or ashes to form, from the cured material; contaminating the component. A material, such as an organic material, which is easily fed into the article, quickly cured, and easily degraded, gasified, and dissipated with temperature, is particularly useful.

Various expanding polymeric materials such as thermoset compounds, polyol based or polyester based polyurethane combined with isocyanate based resins, and thermoplastic compounds or silicone base polymers combined with foaming or blowing agents (hereafter referred to as foaming agents) such as azodicarbonamide, modified azodicarbonamide, p-toluenesulfonyl semicarbazide can be used. Stepanfoam ™ RM9124 (isocyanate/polyol), a thermoset compound produced by Stepan Chemical Company Northfield, Ill., is preferred for use in turbine blades and vanes. Stepanfoam has a density of 14 lbs/ft$^3$ and a curing time of approximately 10 minutes at room temperature.

An important aspect of filling turbine components utilizing the present invention, is accumulation of material on the surface of the article. This can create problems when the component is encapsulated within a mold, for component protection and easy handling, or processed in another fashion. If the surface of the filled component is uneven, due to clumps of cured material, the blade will not fit within the encapsulant mold or other tooling.

On the other hand, if the excess material is removed, partial cells will be exposed, producing crevices where contaminants can collect. Since excess material cannot readily be removed it is desirable to have a relatively smooth surface, post-curing, such that the hollow cavities are sealed, and the blade/vane can be embedded within the encapsulant. This is accomplished by either wrapping the blade/vane in molding paper, or using a mold, such as a conforming mold or an inflating cuff which mold to the external form of the article, such that all but one of the hollow cavities' surface connections are covered. Excess thermoset material can not be cut, machined, or removed in any known manner for a proper fit into an encapsulant mold, since the partial cells which will be exposed can gather and retain contaminants. However, thermoplastic material can be remelted or smoothed such that partial cells are eliminated.

Figure 1:
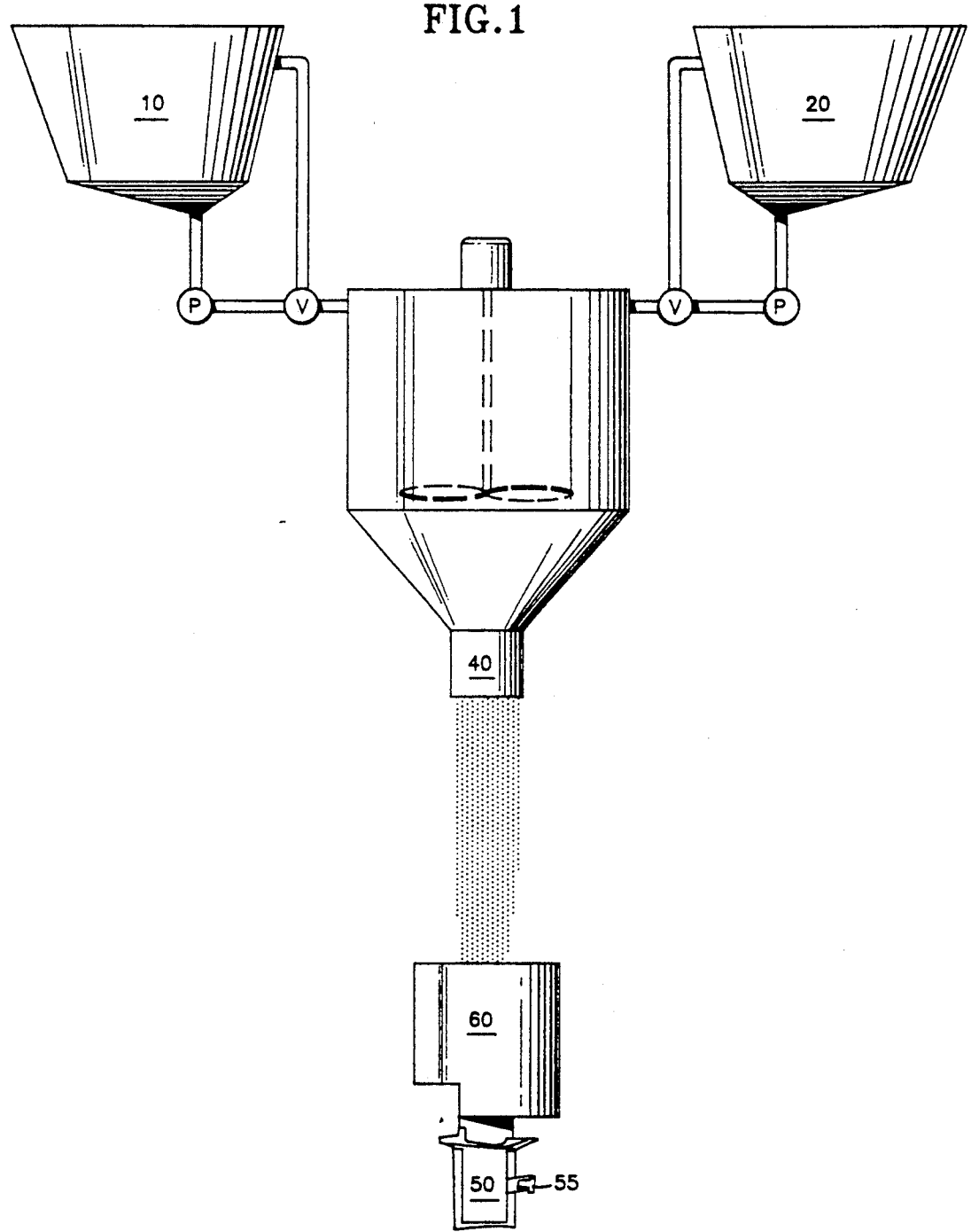
FIG. 1 is a schematic of an embodiment of the present invention.
Figure 2A:
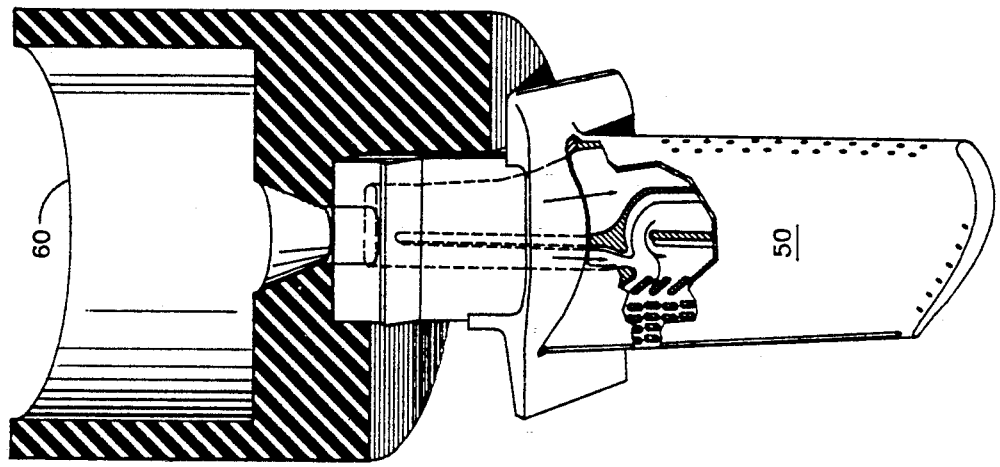
FIG. 2A is a cross sectional view of a turbine blade and boot which have been assembled for use with the present invention.
Figure 2:
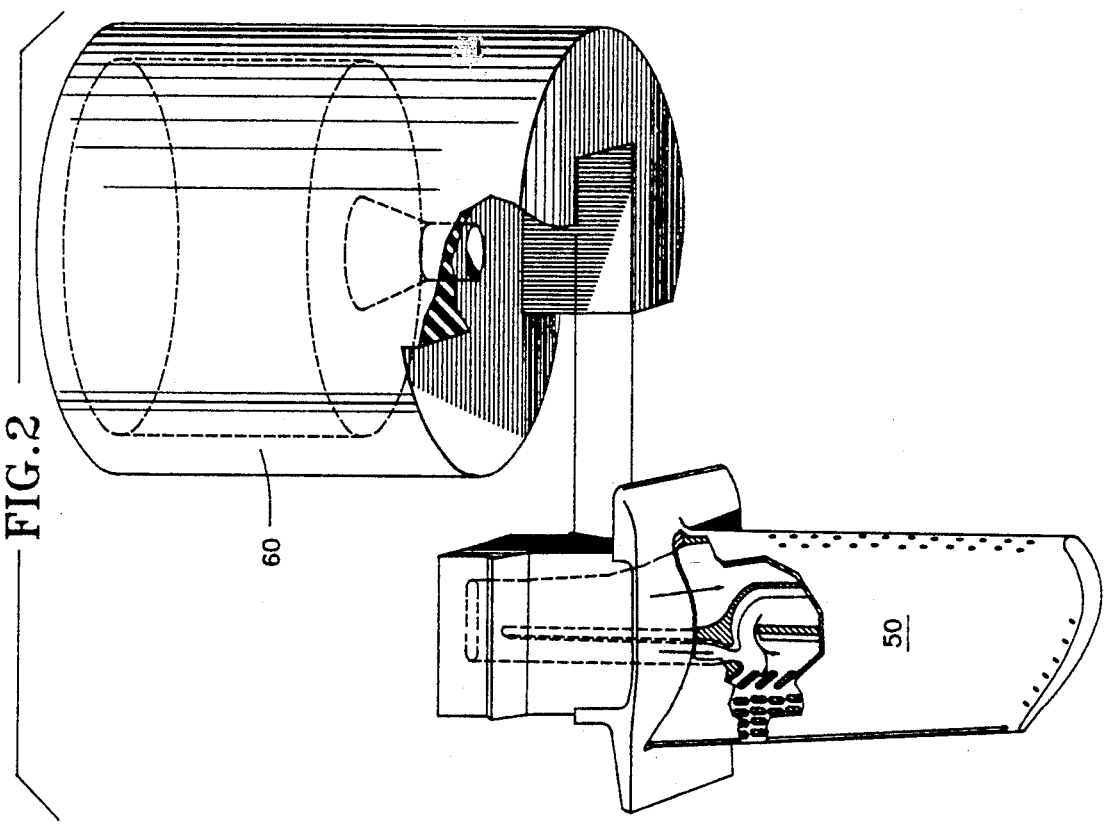
FIG. 2 is a cross sectional view of the boot used to funnel the material into a turbine blade, and the turbine blade itself.

FIG. 1 is a schematic of a method and apparatus for practicing the present invention. Container (10) and (20), at room temperature with a nitrogen blanket, contain isocyanate and polyol, respectfully. The hoses (15) between the containers (10,20) and the mix head (30), and the mix head (30) itself are maintained at approximately 40° C. in order to prevent the equipment from absorbing heat. The reaction between the polyol and the isocyanate is exothermic. If the temperature changes there is a significant viscosity change which effects the flow rate. Stepanfoam (35), the material from the mix head (30), is gravity fed into a turbine blade (50) which is clamped within a contour mold (55), through the boot (60) at point (40).

For articles with hollow cavities which have small surface connections, the process is modified by utilizing negative pressure infiltration to ensure that all of the surface connections are sealed. The articles are placed within a negative pressure chamber (100; see FIG. 3) with the boot (60) remaining outside the chamber (100). As in FIG. 1, the material is fed through the boot (60), into the blade (50). The negative pressure forces the filler material to seal the small surface connections.

The burning out process, for removal of the foam from the article, causes the material to degrade, gasify, and dissipate. For example, for turbine blades filled with Stepanfoam, the burning out process is accomplished by first bringing the blade up to the desired temperature; 9° C./min. until it reaches 700° C. The blade is maintained at 700° C. for 30 min. in a chamber which has 3 chambers volume/min. of air circulated through it. The exhaust gas from this cycle is fed to a second burner at 1000° C. for 2 sec. to burn remaining gas. While the blade is being heated to 700° C., the organic compound burns, turning to gas and ash. At 700° C. the ash is burned, producing water, hydrogen cyanide, carbon monoxide, and carbon dioxide, among possible other products. The second burner burns the cyanide and some of the carbon monoxide, leaving the exhaust environmentally safe.

One of the advantages of using a foaming agent is revealed during the removal process. As the filler material is on route to degradation, the material expands, and the cells, originally produced by the foaming agent, absorb the expansion of the matrix. If a foaming agent had not been employed, the expansion of the matrix could cause damage to the article.

This present invention will be clarified by reference to the following illustrative example.

EXAMPLE 1

The following procedure can be used to fill a nickel superalloy turbine blade with the foam filler Stepanfoam (refer to FIG. 1).

1. A contour mold (55) is clamped on the turbine blade (50).
2. The blade (50) is preheated to 55° C.
3. The reactants, isocyanate resin (10), and polyol (20), are maintained room temperature, under a dry nitrogen blanket (to prevent them from reacting with water in the air).
4. The reactants are fed at 25 g/min, through hoses (15) into a mix head (30), both maintained at 40° C., and mixed forming Stepanfoam.
5. The blade (50) is gravity fed with 4 g of Stepanfoam from the mix head (30), through the boot (60).
6. The Stepanfoam is cured in air at room temperature for 10 minutes.
7. The blade (50) can now be encapsulated, for example within low melt alloy (as is well known in the art), for manufacture.
8. Post-manufacture, the blade (50) is heated in order to cause the cured material to degrade, gasify, and disperse. This is accomplished by loading the blade in a furnace, and slowly increasing the temperature to 700° C. (at a rate of about 9° C./min.) with the air in the chamber exchanged at the rate of 3 chambers volume/minute. The blade is maintained at 700° C. for 30 min., and then cooled as rapidly as is practical. Note, the exhaust gas from this cycle is fed to a second burner for 2 seconds at 1000° C. in order to burn the hydrogen cyanide and carbon monoxide, resulting in an environmentally safe exhaust.

EXAMPLE 2

The following procedure can be used to fill a nickel superalloy turbine blade with thermoplastic compound and azodicarbonamide in powder form.

1. A contour mold (55) is clamped onto a turbine blade (50).
2. The thermoplastic compound is ground into a fine powder.
3. 4.95 g of the ground thermoplastic compound is shaken with 0.05 g of azodicarbonamide (a ratio of 99:1 is used).
4. The 5.00 g mixture is poured into the blade (50) which is then heated to 220° C. for 30 min.
5. The blade (50) can now be encapsulated, for example within low melt alloy, for manufacture.
6. Post-manufacture, the blade (50) is heated in order to cause the cured material to degrade, gasify, and disperse. This is accomplished by loading the blade in a furnace, and slowly increasing the temperature to 250° C. (at a rate of about 9° C./min.) with the air in the chamber exchanged at the rate of 3 chambers volume/minute. The blade is maintained at 250° C. for 30 min., and then cooled as rapidly as is practical. Note, the exhaust from this cycle is fed to a second burner for 2 seconds at 1000° C. in order to burn any hydrogen cyanide, carbon monoxide, or organics in the system, leaving an environmentally safe exhaust gas.

Note, the above processes can also be used to seal a turbine vane or any other hollow article with expanding polymeric compounds such as polyol based and polyester based polyurethanes/isocyanate, or with a mixture of a thermoplastic compound or silicone base polymer mixed and a foaming agent by adjusting the temperatures and times accordingly.

Although this invention has been shown and described with respect to detailed embodiments thereof, it will be understood by those skilled in the art that various changes in form and detail thereof may be made without departing from the spirit and scope of the claimed invention.

We claim:

1. A method of producing a relatively smooth surface on an article containing cured material within said article, said article having at least one surface connected internal cavity, which comprises:
   a. using a mold;
   b. clamping said mold to the article;
   c. filling said cavity with expanding polymeric material, wherein said expanding polymeric material is negative pressure infiltrated into said article;
   d. curing said expanding polymeric material;
   e. unclamping said mold from said article;
   f. processing said article; and
   g. removing said cured material from said article;

whereby the mold essentially conforms to the shape of the article, preventing excess expanding polymeric material from gathering in clumps on the surface of the article.

2. A method as in claim 1 wherein the mold is selected from the group consisting of molding paper, a conforming mold, and an inflating cuff.

* * * * *